J. E. GLEASON, A. L. STEWART & E. W. BULLOCK.
GEAR CUTTING MACHINE.
APPLICATION FILED JUNE 8, 1914.

1,203,608.

Patented Nov. 7, 1916.
13 SHEETS—SHEET 1.

Fig. 1

Witnesses
Walter B. Payne
Nelson H. Opp

Inventors
James E. Gleason
Arthur L. Stewart
Edward W. Bullock
By
their attorneys

J. E. GLEASON, A. L. STEWART & E. W. BULLOCK.
GEAR CUTTING MACHINE.
APPLICATION FILED JUNE 8, 1914.

1,203,608.

Patented Nov. 7, 1916.
13 SHEETS—SHEET 2.

J. E. GLEASON, A. L. STEWART & E. W. BULLOCK.
GEAR CUTTING MACHINE.
APPLICATION FILED JUNE 8, 1914.

1,203,608.

Patented Nov. 7, 1916.
13 SHEETS—SHEET 5.

Witnesses
Walter B. Payne
Nelson H. Copp

Inventors
James E. Gleason
Arthur L. Stewart
Edward W. Bullock
By Church & Church
their Attorneys J. E. GLEASON, A. L. STEWART & E. W. BULLOCK.
GEAR CUTTING MACHINE.
APPLICATION FILED JUNE 8, 1914.

1,203,608.

Patented Nov. 7, 1916.
13 SHEETS—SHEET 7.

Inventors
James E. Gleason
Arthur L. Stewart
Edward W. Bullock

J. E. GLEASON, A. L. STEWART & E. W. BULLOCK.
GEAR CUTTING MACHINE.
APPLICATION FILED JUNE 8, 1914.

1,203,608.

Patented Nov. 7, 1916.
13 SHEETS—SHEET 8.

Inventors
James E. Gleason
Arthur L. Stewart
Edward W. Bullock

Witnesses
Walter B. Payne
Nelson H. Copp

By Chamberlin
their Attorneys

J. E. GLEASON, A. L. STEWART & E. W. BULLOCK.
GEAR CUTTING MACHINE.
APPLICATION FILED JUNE 8, 1914.

1,203,608.

Patented Nov. 7, 1916.
13 SHEETS—SHEET 12.

Witnesses
Walter B. Payne
Nelson H. Copp

Inventors
James E. Gleason
Arthur L. Stewart
Edward W. Bullock
By Church & Ruth
their Attorneys J. E. GLEASON, A. L. STEWART & E. W. BULLOCK.
GEAR CUTTING MACHINE.
APPLICATION FILED JUNE 8, 1914.

1,203,608.

Patented Nov. 7, 1916.

Witnesses
Walter B. Payne
Nelson H. Copp

Inventors
James A. Gleason
Arthur L. Stewart
Edward W. Bullock
By
their Attorneys

UNITED STATES PATENT OFFICE.

JAMES E. GLEASON, ARTHUR L. STEWART, AND EDWARD W. BULLOCK, OF ROCHESTER, NEW YORK, ASSIGNORS TO GLEASON WORKS, OF ROCHESTER, NEW YORK, A CORPORATION OF NEW YORK.

GEAR-CUTTING MACHINE.

1,203,608.      Specification of Letters Patent.      Patented Nov. 7, 1916.

Application filed June 8, 1914. Serial No. 843,720.

*To all whom it may concern:*

Be it known that we, JAMES E. GLEASON, ARTHUR L. STEWART, and EDWARD W. BULLOCK, all of Rochester, in the county of Monroe and State of New York, have invented certain new and useful Improvements in Gear-Cutting Machines; and we do hereby declare the following to be a full, clear, and exact description of the same, reference being had to the accompanying drawings, forming a part of this specification, and to the reference-numerals marked thereon.

Our invention relates to gear cutting machinery, with particular reference to that type of apparatus which is employed for cutting curved or so-called spiral teeth and for producing teeth of this character on bevel gears, and it has for its particular object to provide an improved construction and arrangement of parts, affording a structure which is in the nature of an improvement upon and possesses marked advantages over the apparatus shown and described in the pending application of James E. Gleason, Serial No. 769,808, filed May 26, 1913.

A further purpose of the invention is to afford a practical and efficient machine that will automatically generate a curved bevel gear tooth, or what is commonly known as a spiral bevel gear tooth, although the present machine does not contemplate cutting on a curve defined by a true spiral, since a tooth of any curvature is believed to possess the inherent advantages in a gear constructed according to our invention, and it is our present purpose to construct a machine that can be successfully applied in generating different sizes of gears having curved teeth, with such speed and accuracy as to make it practicable for a gear of this type to be used on a large scale commercially.

To these and other ends the invention consists in certain improvements and combinations of parts, all as will be hereinafter more fully described, the novel features being pointed out in the claims at the end of the specification.

In the drawings.

Similar reference characters throughout the several views indicate the same parts.

In order to afford a general understanding of the nature and operation of our machine, we will state that there is preferably employed a rotating annular cutter which is mounted on an oscillatory support in the nature of a cradle that is adapted to be moved back and forth so as to present the cutter to the work in different relations, the work or blank being simultaneously rolled or moved relatively to the cutter and in this manner the side or profile of the tooth is automatically generated by an effect corresponding to a pair of gears rolling one upon the other, while at the same time the tooth is curved longitudinally by reason of the annular formation of the cutter resulting in cutting through an arcuate path. After each complete operation, resulting in the completion of one side of a tooth, the frame on which the blank carrier is mounted is automatically moved to withdraw the work from operative engagement with the cutter and while the blank is in this retracted position, the indexing mechanism is brought into operation and automatically moves the blank the space of one tooth so as to present an uncut portion to the cutter when the frame is returned to its initial position. The cutter support or cradle is operated first in one direction and thence backwardly to its first position by a suitable reversing mechanism that is connected also with the blank whereby the latter is rolled or rotated on its longitudinal axis coincident with the oscillatory movement of the cutter support, the movement of the parts as thus generally described being preferably obtained by suitably timed gearing.

In the present arrangement, which illustrates a preferred embodiment of the structure, although the invention is not to be limited to the precise combination set forth and described, 1 designates the base of the machine, on which is mounted the dished bed 2 for the cutter support, said cutter support being preferably in the form of a cradle 3 which is provided on its lower face with tracks 4 adapted to travel in corresponding guideways on the bed 2. Adjustably mounted on the cradle 3 is a base plate 5 which is adjustable laterally by means of a screw 6 and carries vertically arranged tracks 7 which support a casting 8 upon which the cutter and drive mechanism therefor is arranged, said casting being adjustable on the guides 7 by means of a threaded post 9. The cutter is preferably of annular formation, consisting of a series of cutting blades, designated at 10, arranged about a disk and extending in a direction parallel with the axial line of the shaft 11 on which the cutter is mounted. The shaft 11 is mounted in suitable bearings and carries a bevel gear 12 which is driven from the main drive shaft 13 in the following manner: The drive shaft 13 carries the pulley 14 which may be operated from any desirable source of power and also a bevel pinion 15 meshing with the corresponding pinion 16 on the shaft 17. The latter carries at its opposite end a corresponding pinion engaging the gear 18, keyed on the shaft 19, which through the bevel gear 20 operates a vertical shaft 21 upon which is splined a bevel gear 22. 23 is a stub shaft mounted in bearings in the casting 8, having at one end a bevel gear 24 engaging the gear 22, and at its opposite end a bevel pinion 25 meshing with the gear 26 upon the shaft 27. 28 is a spur gear mounted on the opposite end of the shaft 27 and meshing with a corresponding gear 29 on the shaft 30. 31 is a shaft mounted parallel with the shafts 27 and 30 and carrying a bevel pinion 32 which engages the bevel gear 12 on the cutter spindle 11. The shaft 31 also carries a gear 33 meshing with the spur gear 34 on the shaft 30. It will be seen that through the gearing thus described, motion is constantly transmitted from the main drive to the rotating cutter; and by the arrangement of gearing and bearings, the position of the cutter may be altered, both as to vertical and horizontal adjustment to accommodate work of different character.

Figure 1:
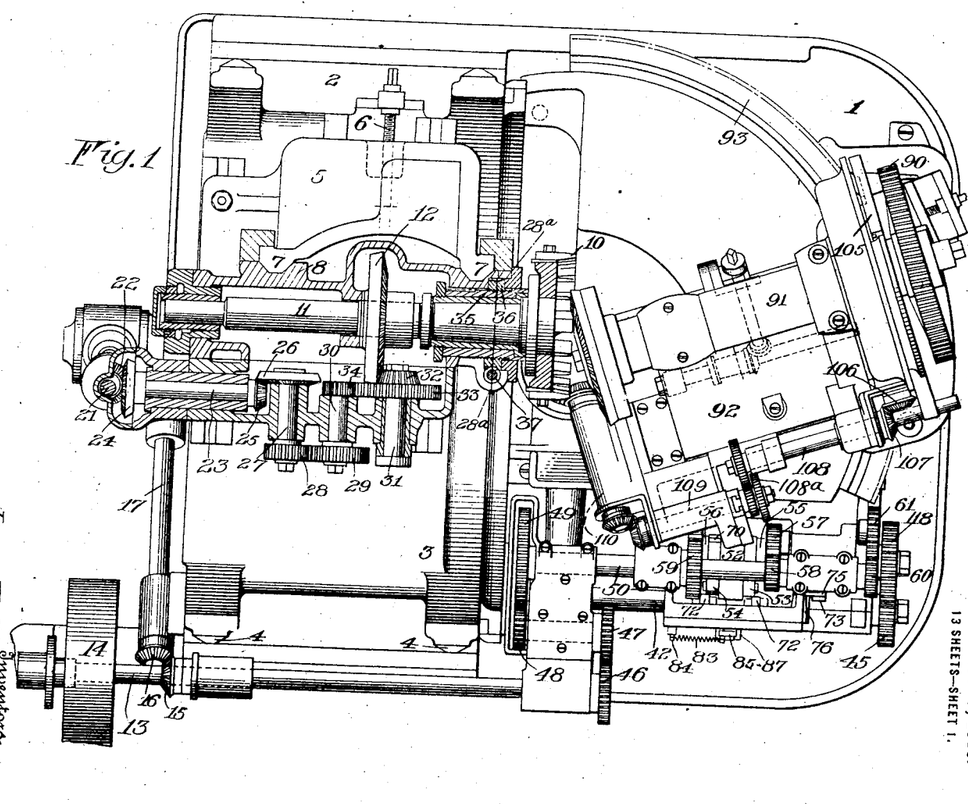
Figure 1 is a plan view with the parts in section.
Figure 2:
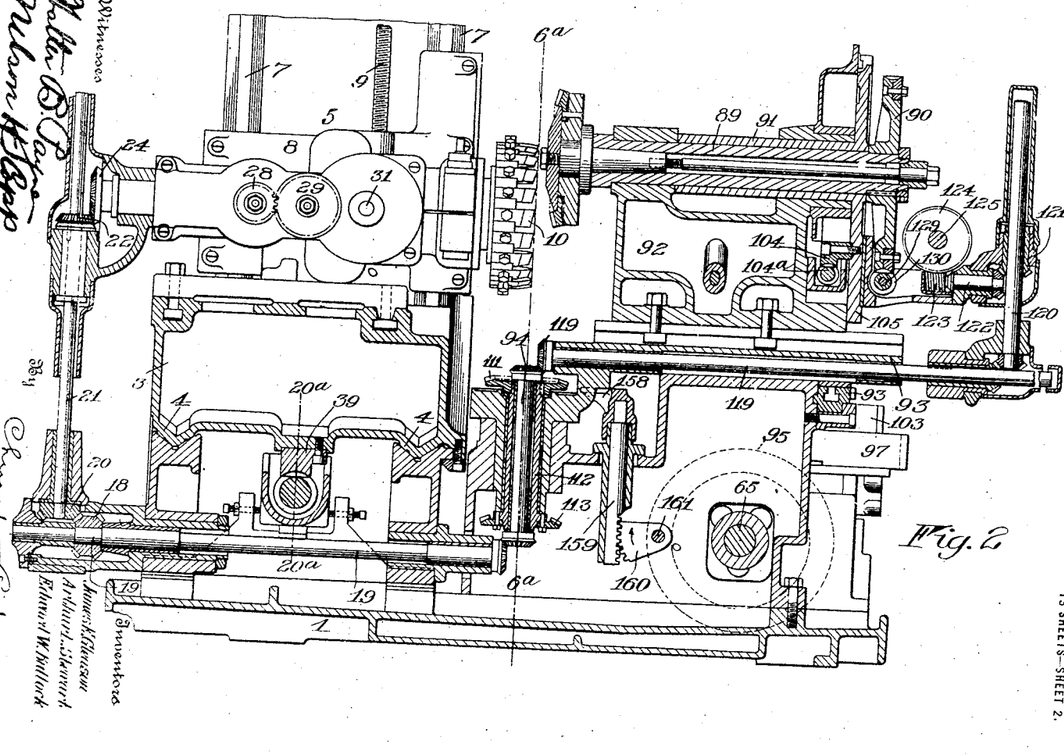
Fig. 2 is a vertical central sectional view showing parts in side elevation, the blank carrier being withdrawn from cutting position.
Figure 3:
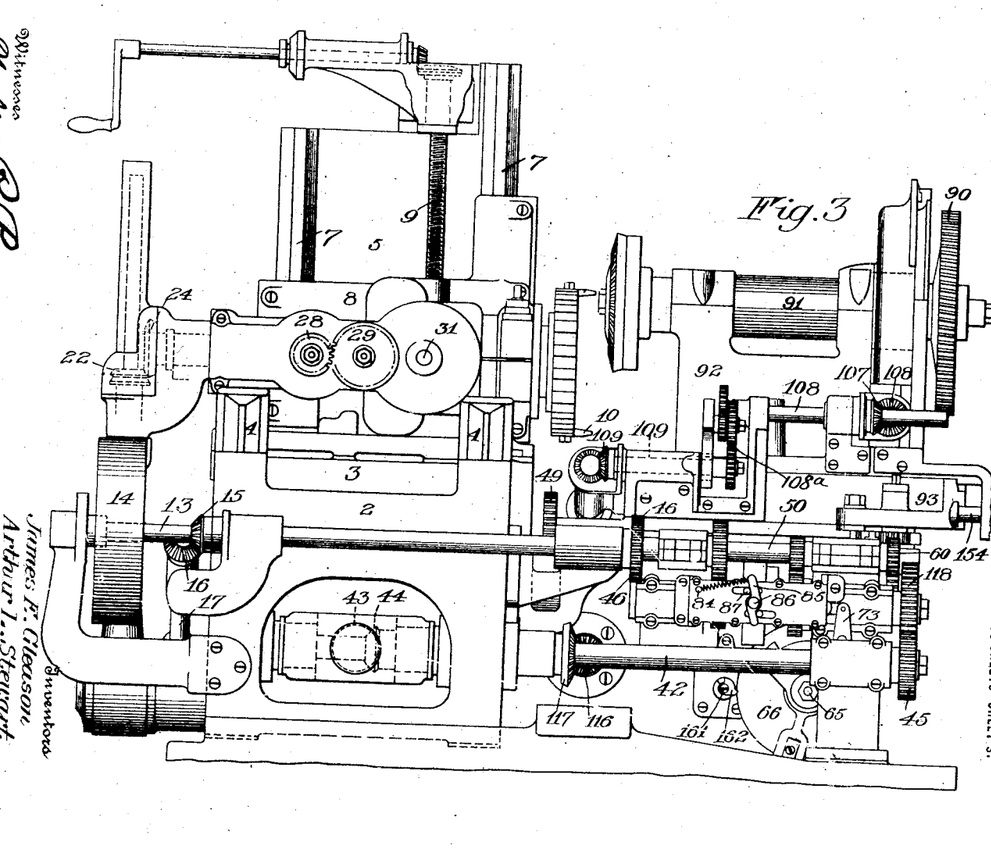
Fig. 3 is a side elevation of the machine with the parts in the same position as in Fig. 2.
Figures 26, 27, 28:
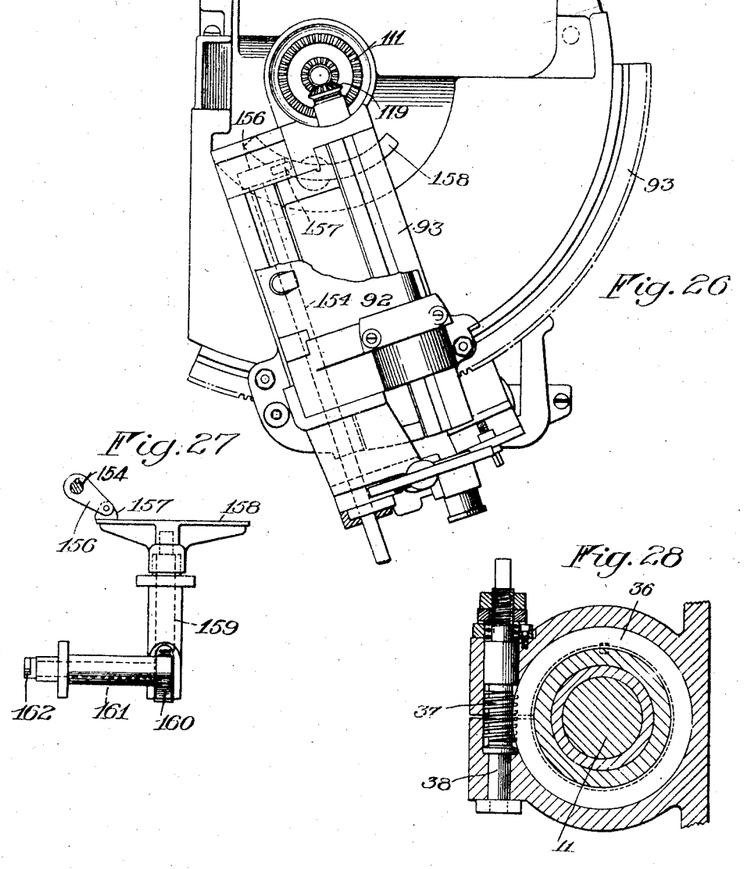
Fig. 26 is a plan view of a part of the frame on which the blank carrier is mounted.
Fig. 27 is a detail view of a portion of the controlling mechanism for the indexing mechanism.
Fig. 28 is a sectional view on the line $28^a$—$28^a$ of Fig. 1.

In order to adjust the cutter in a direction toward and from the work, we may employ the construction shown in Figs. 1 and 28, in which the spindle 11 is adjustable longitudinally of its axis. To this end there is arranged on the spindle a sleeve 35 which is threaded exteriorly for a portion of its length and engaged by an adjusting ring 36, that also has threaded engagement with the sleeve 35 and is formed on its exterior with a series of worm teeth with which coöperates a worm 37 secured on the adjusting spindle 38. It will be seen that by turning the adjusting spindle 38, rotation of the adjusting ring 36 is effected and this causes a corresponding longitudinal movement of the sleeve 35 and with it the cutter spindle 11.

The cradle or cutter support 3 is oscillated about an axis other than the rotary axis of the cutter spindle 11 on the guideways of the base 2 and to this end it carries a toothed segmental rack 39. Journaled in suitable bearings in the base is a shaft 40 carrying a worm 41 which engages the toothed rack 39 and is rotated alternately in opposite directions so as to effect the necessary oscillation of the cradle. The shaft 40 is driven from the shaft 42 by means of coöperating beveled pinions 43 and 44 mounted respectively on the shafts 40 and 42, said shaft 42 carrying at its opposite end a gear 45 which is driven in a manner that will now be described.

Figure 11:
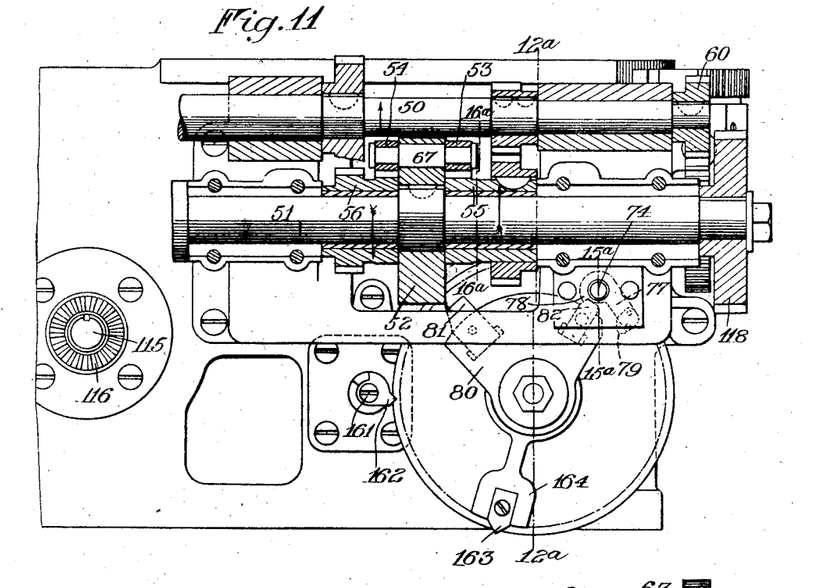
Fig. 11 is a vertical sectional view of the reversing mechanism.

The main drive shaft 13 is provided at one end with a gear 46 which operates through the change gears 47 and 48 to drive the gear 49 on the shaft 50 which is shown enlarged in Fig. 11 and constitutes the driving member of the reversing mechanism. The driven member, which is alternately rotated in opposite directions, and transmits its motion to the various parts of the apparatus, is indicated at 51 and comprises a shaft upon which is keyed a disk 52. The latter is provided with the dogs or clutches 53 and 54, which are connected for simultaneous movement and arranged on opposite sides of the disk, as shown in Figs. 11, 16 and 17. Loosely mounted on the shaft 51 is a pair of sleeves 55 and 56 which coöperate with the clutches 53 and 54 respectively, and are constantly driven in opposite directions from the driving shaft 50. Each of the sleeves 55 and 56 is provided with a gear wheel, the gear on sleeve 55 being driven through the intermediate gear 57 meshing with the gear 58 on the shaft 50, while the sleeve 56 is operated directly from the gear 59. The shaft 50 also carries a pinion 60 in engagement with an intermediate gear 61 which meshes with a gear 62 carried upon a shaft 63, the latter being provided with a worm 64. In this manner, the worm 64 is constantly rotated in one direction and transmits its motion to the shaft 65 through a worm wheel 66. The operation of the clutches 53 and 54 is controlled from the shaft 65 in a manner which we will now explain.

Figure 17:
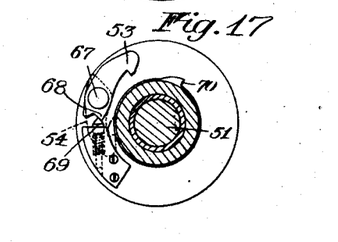
Fig. 17 is a similar view showing the parts in another position.
Figure 18:
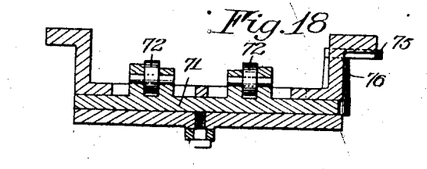
Fig. 18 is a horizontal sectional view taken longitudinally through the reversing slide on the line $18^a$—$18^a$ of Fig. 10.
Figure 19:
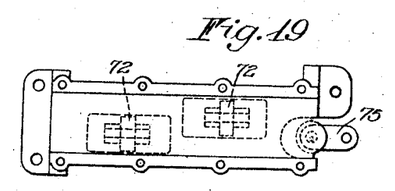
Fig. 19 is an elevation of the reversing slide bracket with the cap removed.
Figure 20:
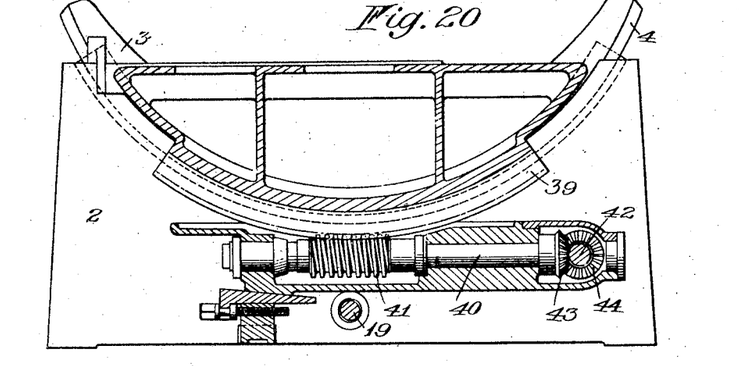
Fig. 20 is a vertical sectional view of the cutter support on the line $20^a$—$20^a$ of Fig. 2.

The dogs or clutches 53 and 54 are fixedly mounted upon the oscillatory pin 67 which is suitably journaled in the disk 52, and the dog 53 is provided with a notched tail piece 68 with which coöperates a spring actuated pin or plunger 69 so as to hold the dogs normally in the position shown in Fig. 17. The sleeves 55 and 56 are each provided with a shoulder or projection 70 arranged to be engaged alternately by the dogs 53 and 54. With the parts in the position shown in Fig. 17, the disk 52 is being carried around by dog 54, and when the pin 67 is rocked it brings the other dog 53 into engagement with the corresponding shoulder 70, causing the disk to be rotated in the same direction as the corresponding sleeve. To reverse the operation of the disk, it is necessary to rock the pin 67 in the opposite direction disengaging the one clutch and bringing the other clutch into engagement with the shoulder on the oppositely rotating sleeve. This movement of the clutches is secured automatically through a reversing slide designated at 71 and provided with a pair of anti-friction rollers 72, forming abutments which are projected into the path of the tail pieces of the dogs, one of the rollers 72 coöperating with one dog while the other coöperates with the other dog. Thus by reciprocating the slide 71, the clutches are alternately engaged with the constantly loose rotating sleeves on the driven member, and through these, the driven member is rotated in opposite directions at regular and predetermined intervals. The slide 71 is operated from a crank arm 73 carried on the shaft 74 and connected by link 75 with a post 76 on said slide. The shaft 74 also carries an arm 77 which is provided with a shoulder 78 and an end portion 79 by which the shaft is operated in opposite directions. This movement is obtained from the shaft 65 by means of a segmental arm 80 carried on said shaft and provided with a pair of cams or extensions 81 and 82. As the shaft 65 is rotated, the cam 82 comes into engagement with the shoulder 78, as shown in Fig. 11, rocking the shaft 74 in one direction, after which it returns to its initial position. Subsequently, the cam 81 engages the end portion 79 of the arm 77, moving the latter upwardly and rocking the shaft 74 in the opposite direction. This causes the automatic reversal of the movement of the driven member 51, the timing of such reversal being determined by the position of the cams 81 and 82. The reversing slide is returned to its normal or intermediate position, after each operation of cams 81 and 82, by means of a spring 83 which is connected at one end to a stationary post 84 and at its opposite end to a lever 85 pivotally mounted at 86 upon the casing or box within which the slide 71 is housed. The lever 85 embodies oppositely extending arms each of which coöperates with a pin or projection 87 upon the slide, the casing being slotted at 88 to permit longitudinal movement of the pins 87 as the slide is operated first in one direction and then in the other, while the spring 83 serves to return the slide to its normal position.

The blank carrier is designated at 89 and comprises an arbor having fixed thereon at its outer end a worm wheel 90, and arranged within a sleeve 91 which is mounted in suitable bearings on the bracket 92. The bracket 92 is adjustably arranged upon a turret or frame 93 which is pivotally mounted to swing about a vertical axis determined by the central shaft 94. The frame or turret 93 is oscillated at predetermined intervals to move the blank out of engagement with the cutter to permit the indexing operation, and thereafter to return it to position for cutting. In order to effect such a movement of the frame automatically, we provide a cam 95 fixed upon the aforementioned shaft 65 and coöperating with the projection 96 attached to the plate 97. The plate 97 is adjustably secured to the frame and to this end carries an adjustable block 98 arranged in a guideway 99 and provided with a stud 100 which engages a corresponding opening in the block 101, the latter being slidably disposed in a guideway 102 of the carrier 103, which latter is attached to and forms a part of the pivoted turret or frame. The cam slot of the cam 95 is of such a formation that while continuously driven, it holds the blank in engagement with the cutter for a sufficient period to permit the completion of one cutting operation and withdraws the blank for a period long enough to permit the latter to be indexed while it is disengaged from the cutter.

The rolling or generating movement of the work, which occurs during the cutting operation in order to effect the proper generation or shaping of the sides of the tooth is obtained through a toothed segment 104 which is secured upon the plate 105 carried by the sleeve 91, it being understood that under normal conditions, the sleeve 91 is locked for rotation with the arbor 89 and thus any movement of the toothed segment referred to is transmitted to the blank during the cutting operation. The segment 104 is engaged by the worm 104$^a$ mounted on a shaft which carries a bevel pinion 106 in engagement with a corresponding pinion 107 keyed to the shaft 108. The latter is driven through suitable change gears designated generally at 108$^a$, from the shaft 109 mounted in bearings on the frame, said shaft 109 being in turn driven from the shaft 110. The shaft 110 is rotated through a bevel gear 111 which is fixed upon the vertical sleeve 112, carrying at its lower end a gear 113 engaged by the bevel pinion 114. 115 designates a spindle carrying said pinion 114 and at its opposite end provided with a pinion 116 that is operated from the gear 117 mounted upon the shaft 42 which is driven alternately in opposite directions by the reversing mechanism through a gear 118 keyed upon the driven shaft 51 and coöperating with the gear 45 on the shaft 42. In this manner the reversing mechanism operates through the shaft 42 to impart and generate an opposite rotary movement to the blank carrier and at the same time to oscillate or rock the cutter support while the cutter is in operative engagement with the blank and rotates about an axis other than the axis of oscillation of the cutter support.

We will now describe the mechanism by which the blank is indexed between cutting operations through an automatic operation.

Figures 4, 21:
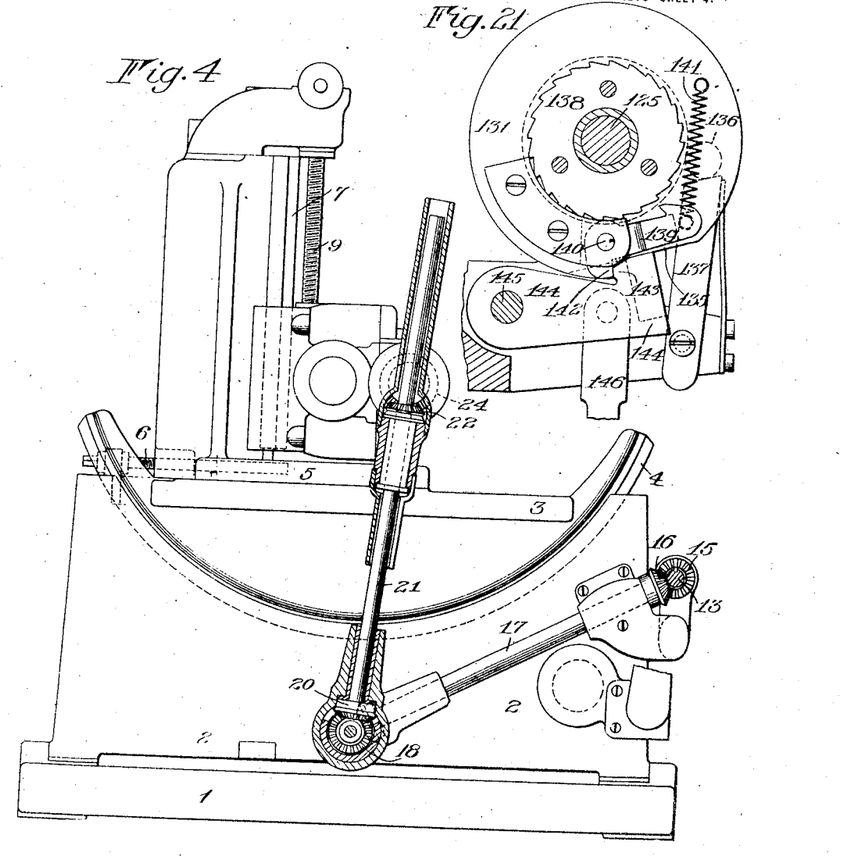
Fig. 4 is an end view of the machine showing parts in section.
Fig. 21 is an enlarged sectional view on the line $21^a$—$21^a$ of Fig. 7.
Figure 5:
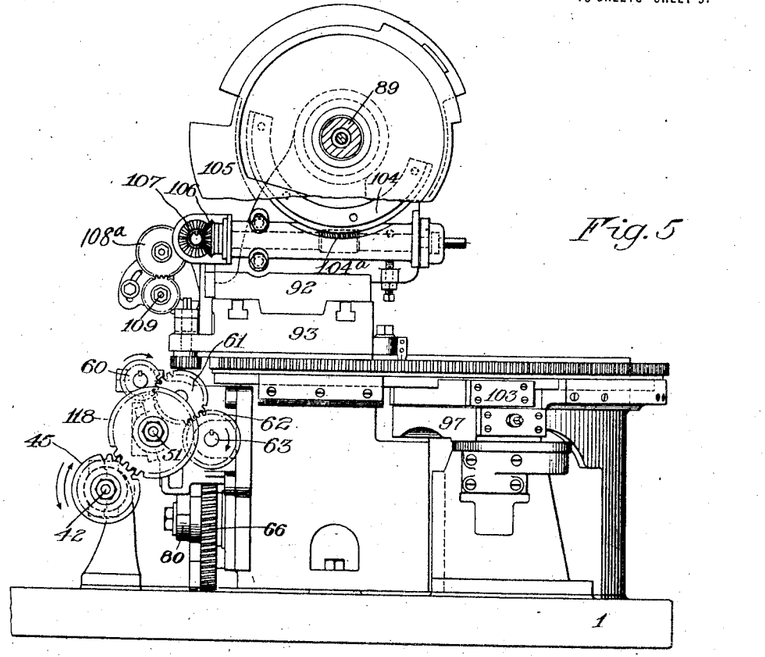
Fig. 5 is an elevation of the opposite end of the machine, partially in section.
Figure 6:
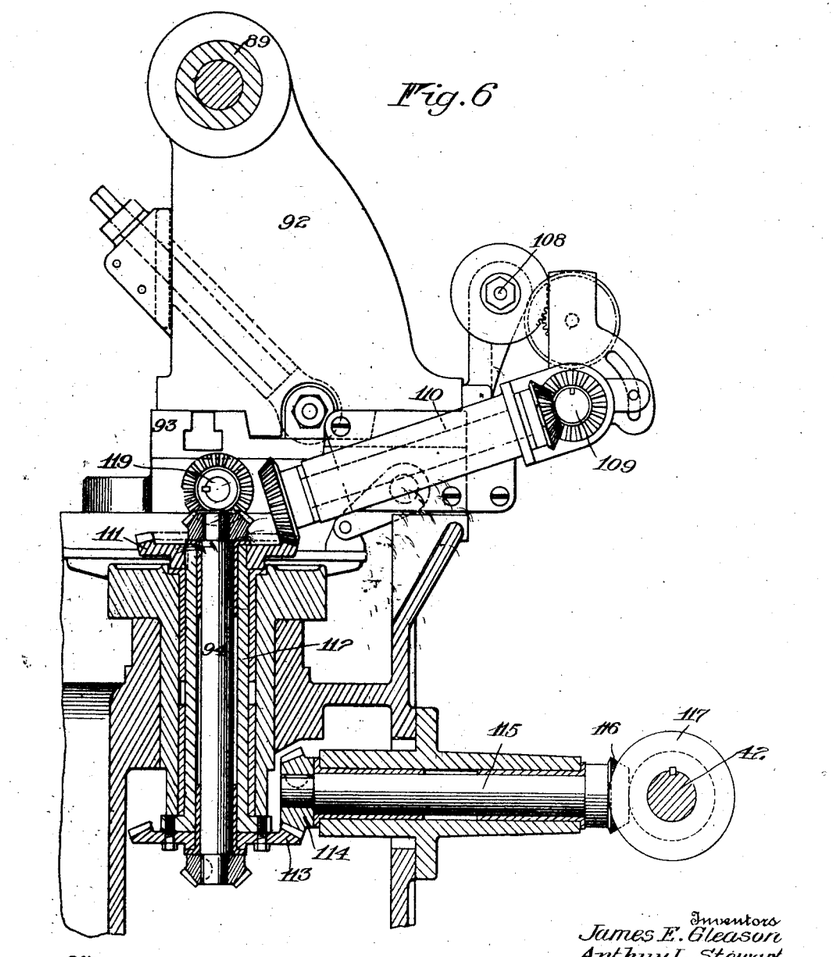
Fig. 6 is a central transverse sectional view on the line 6—6 of Fig. 2.
Figures 7, 8:
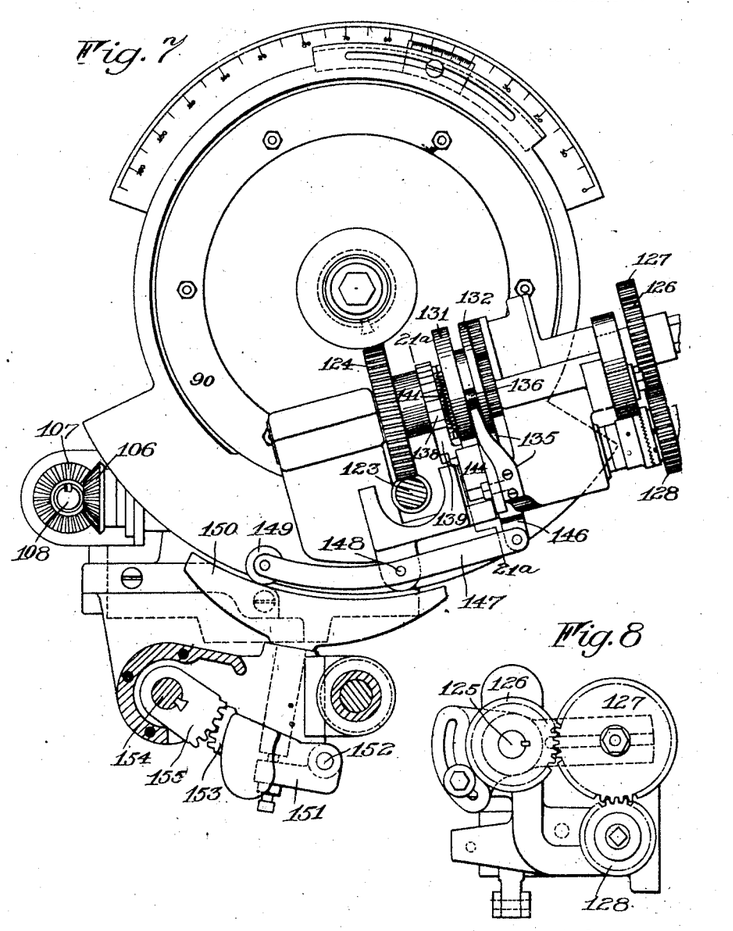
Fig. 7 is an end elevation, showing the index mechanism.
Fig. 8 is a detailed end elevation of the index mechanism.
Figure 9:
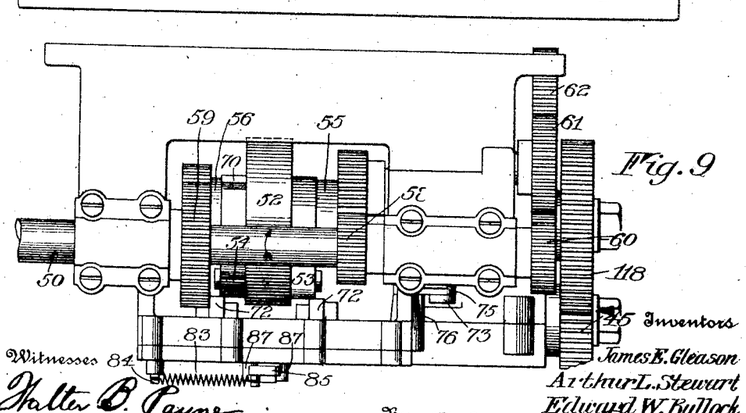
Fig. 9 is a plan view of the reversing mechanism.
Figure 10:
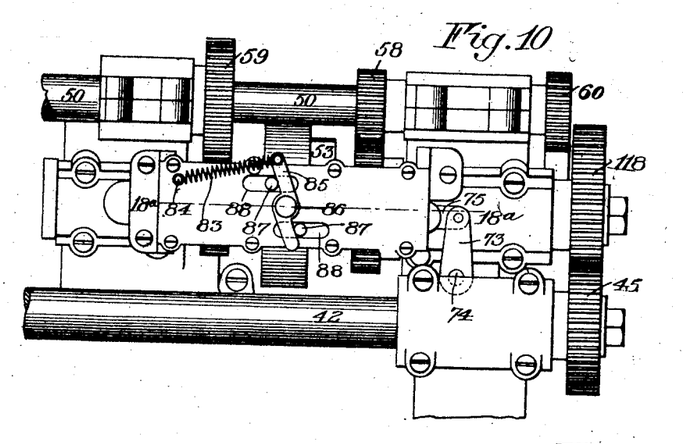
Fig. 10 is a side elevation of the same.
Figures 12, 13:
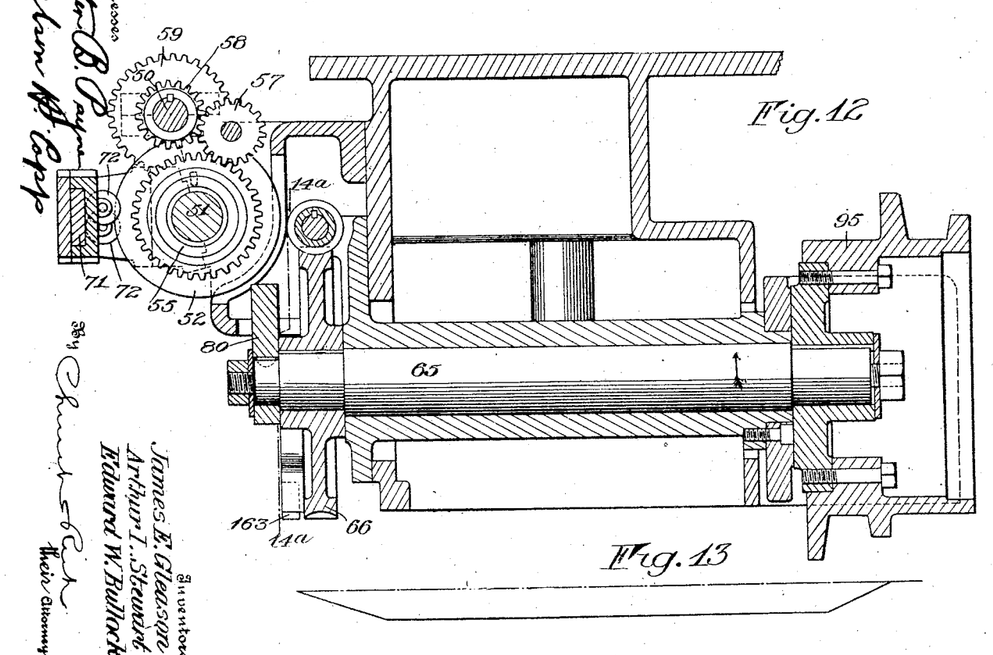
Fig. 12 is a vertical sectional view on the line $12^a$—$12^a$ of Fig. 11.
Fig. 13 is a diagrammatic view showing the development of the cam illustrated in Fig. 12.
Figure 14:
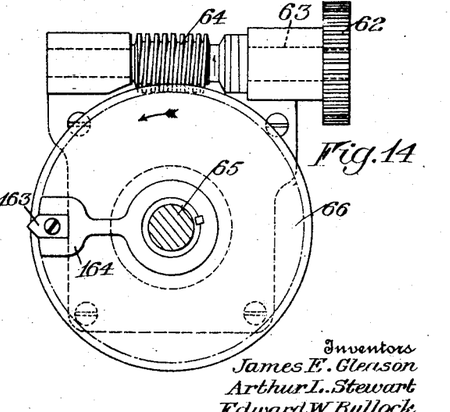
Fig. 14 is a vertical sectional view on the line $14^a$—$14^a$ of Fig. 12.
Figure 15:
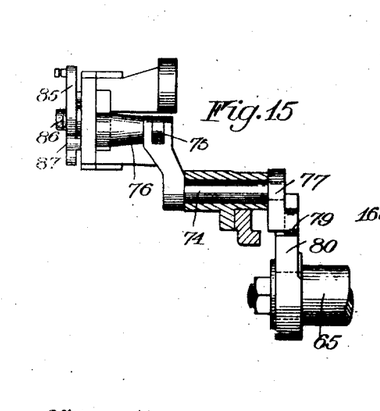
Fig. 15 is a detail view in elevation, with a portion in section on the line $15^a$—$15^a$ of Fig. 11.
Figure 16:
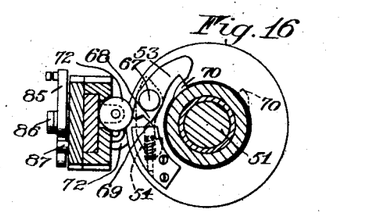
Fig. 16 is a transverse sectional view through the driven member of the reversing mechanism on the line $16^a$—$16^a$ of Fig. 11.
Figure 22:
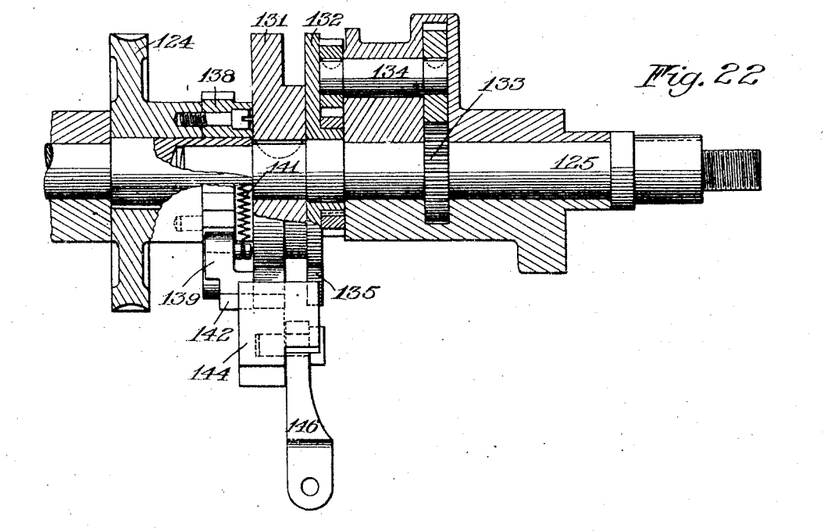
Fig. 22 is a vertical sectional view taken longitudinally of the parts shown in Fig. 21.
Figure 23:
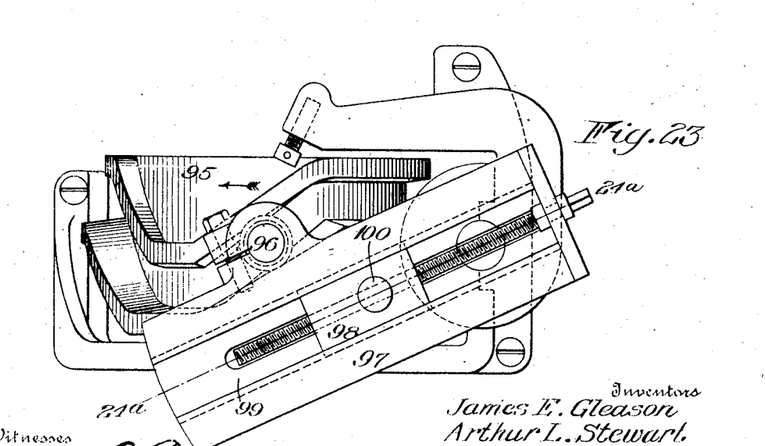
Fig. 23 is an enlarged plan view of the cam shown in Fig. 12 and the coöperating parts.
Figure 24:
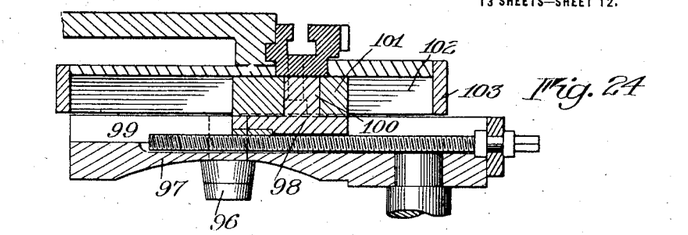
Fig. 24 is a sectional view of the parts connecting said cam with the frame on the line $24^a$—$24^a$ of Fig. 23.
Figure 25:
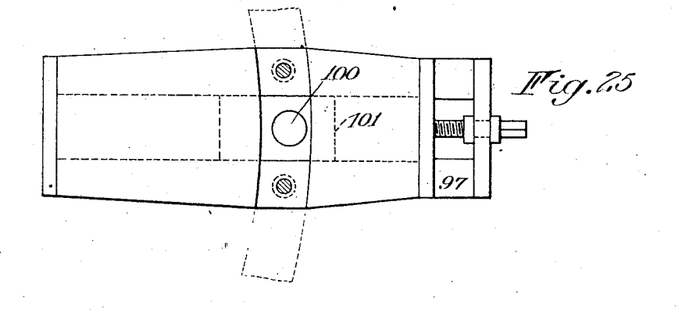
Fig. 25 is a plan view of the parts shown in Fig. 24, with the upper portion omitted.

The index mechanism is driven from the shaft 19 through the vertically disposed shaft 94 which is geared to the spindle 119, the latter in turn driving the vertical spindle 120. The gear 121 mounted on the shaft 120 transmits movement to the stud shaft 122 which carries the worm 123 in engagement with the worm wheel 124 which is loosely mounted upon a shaft 125. The latter carries a gear 126 meshing with the intermediate gear 127 which in turn engages a gear 128, mounted upon shaft 129. Said shaft 129 carries a worm 130 in engagement with the worm wheel 90. The worm wheel 124 is constantly rotated while the shaft 125 is normally stationary, and through the worm 130 serves to hold the blank against any relative movement within the sleeve 91 except when the parts are released to index the work in the manner which we will now describe. To this end, the shaft 125 carries a disk 131 fixed thereon and a loosely arranged disk 132. The shaft is also provided with a gear 133 which drives a stub shaft 134 arranged parallel to the main shaft 125 and operated through suitable gears as shown in Fig. 22 to drive the loosely mounted disk 132, the parts being so geared that the loose disk 132 makes one revolution while the fixed disk 131 is making two. The disk 132 is provided with a flat surface 135 at its edge for a purpose that will appear presently and also carries a stop or projection 136 arranged to be engaged by a pivoted spring actuated abutment 137. The worm wheel 124 has attached thereto a ratchet wheel 138 and pivotally mounted on the disk 131 is a spring actuated clutch or dog 139 pivoted at 140 and controlled by the spring 141. The dog 139 carries a tail piece or projection 142 which is engaged normally by a shoulder 143 arranged upon an arm 144, pivoted at 145. The parts are shown in normal position in Fig. 21 where the clutch on the disk is disengaged from the ratchet wheel, and when the arm 144 is depressed through the automatic controlling mechanism to be described, the dog is moved into engagement with the ratchet wheel by the spring 141, causing the disk 131 to be rotated with the worm wheel 124. The shaft 125 is thus given two complete revolutions, that is until the flat portion of the disk 132 is returned to its initial position, permitting the arm 144 to withdraw the dog from engagement with the ratchet wheel and at the same time prevent reverse movement of the shaft 125 by engagement of the abutment 137 with the projection 136. Movement of the arm 144 is effected automatically, at predetermined periods, and for this purpose, the arm has connected thereto a link 146 which is pivoted to the lever 147, the latter being pivoted at 148 and carrying an anti-friction device 149. 150 designates a shoe arranged to engage the anti-friction device 149 to effect the operation of the indexing mechanism, said shoe being actuated by the arm 151 secured to a rock-shaft 152 which is further provided with a toothed segment 153. 154 designates a second rock-shaft carrying a toothed segment 155 in engagement with the aforementioned segment 153, and provided at its opposite end with an arm 156 having a foot 157 thereon. 158 designates a segmental table mounted on a spindle 159 and adapted to be elevated and lowered for oscillating the shaft 154. The spindle 159 is operated by a toothed segment 160 which engages a series of teeth formed at the lower end of the spindle and is fixed upon the rock-shaft 161. The latter carries at its other end a tooth or projection 162 arranged for engagement by a cam 163 which is mounted upon an arm 164 carried by the worm wheel 66 as shown in Figs. 11, 12 and 14. By this means, at each revolution of the shaft 65, the rock-shaft 161 is tripped and through it the index mechanism is released causing the blank to be operated through the space of one tooth, after which the blank carrying frame is automatically returned to cutting position, by the mechanism that has been previously described, and another cutting operation takes place.

The operation of the machine may be described briefly as follows: A blank is positioned on the blank carrier, and the latter is then adjusted about the vertical center of the machine until the cutter 10 is at the desired depth with reference to the teeth to be finished, as shown in Fig. 1. It will be understood that the apparatus is primarily designed for finishing the side faces of teeth, or in other words, generating the sides of the teeth after they have been preliminarily roughed out on a roughing machine. The blank and cutter having been adjusted to the position shown in Fig. 1, the machine is set in operation and the cutter head is rotated through one tooth space at a time. During such rotation of the cutter, a relative generating movement of the cutter and blank is obtained by rotating the blank slowly about its own axis, and at the same time rolling the cutter, or in other words, oscillating the cradle or cutter support 3 on the tracks of the base. When the cradle 3 has completed its movement in one direction from one extreme position to the other, the cutter will have completed one face of a tooth, and the blank support is then automatically swung about the vertical center of the machine to withdraw the blank from the cutter, whereupon the cutter support or cradle is moved back to its initial position, ready for a second operation. As the cutter support or cradle is being returned to its initial position, the blank is indexed, while the latter is withdrawn from the cutter, and the blank support is then operated to return the blank into cutting relation with the cutter with the next adjacent tooth face ready to be finished, and the operation is repeated. One side of each tooth is finished entirely around the blank in the manner already described, and the blank is then readjusted with reference to the cutter, and a similar operation takes place for finishing the opposite sides of the tooth.

We claim as our invention:

1. In a gear cutting machine, the combination with a dished bed, of a support movable on said bed, means for oscillating the support, a cutter mounted on the support and embodying a substantially annular cutting portion which is movable through the blank lengthwise of the tooth, means for rotating the cutter, a pivotally mounted frame, a blank carrier arranged on the frame, gearing for rotating the blank carrier, and means for oscillating the frame about its axis.

2. In a gear cutting machine, the combination with a dished bed, of a support movable on said bed, means for oscillating the support, a cutter mounted on the support embodying a substantially annular cutting portion which is movable through the blank lengthwise of the tooth, means for rotating the cutter, a pivotally mounted frame, a blank carrier arranged on the frame and angularly adjustable thereon for changing the position of the blank carrier relatively to the cutter, gearing for rotating the blank carrier alternately in opposite directions, and means for oscillating the frame about its axis.

3. In a gear cutting machine, the combination with a dished bed, of a support movable on said bed, means for oscillating the support, a cutter mounted on the support and embodying a cutting portion which is movable through the blank in a curvilinear path lengthwise of the tooth, means for operating the cutter, a pivotally mounted frame, a blank carrier arranged on the frame, gearing for rotating the blank carrier alternately in opposite directions and means for oscillating the frame about its axis.

4. In a gear cutting machine, the combination with a dished bed, of a support movable on said bed, means for oscillating the support, a cutter mounted in the support and embodying a cutting portion which is movable through the blank in a curvilinear path lengthwise of the tooth, means for operating the cutter, a pivotally mounted frame, a blank carrier arranged on the frame and adjustable thereon for changing the position of the blank carrier relatively to the cutter, gearing for rotating the blank carrier alternately in opposite directions, and means for oscillating the frame about its axis.

5. In a gear cutting machine, the combination with a dished bed, of a support movable on the bed, a cutter mounted on the support, means for actuating the support, means for operating the cutter, a pivotally mounted frame, a blank carrier arranged on the frame, means for rotating the blank carrier to generate the profile of a tooth, and means for oscillating the frame.

6. In a gear cutting machine, the combination with a dished bed, of a support movable on the bed, a cutter mounted on the support, means for actuating the support, means for operating the cutter, a pivotally mounted frame, a blank carrier arranged on the frame and angularly adjustable thereon to change its position relatively to the cutter, means for rotating the blank carrier to generate the profile of a tooth, and means for oscillating the frame.

7. In a gear cutting machine, the combination with a frame pivotally mounted to oscillate about a vertical axis, of a blank carrier mounted on said frame, a cutter support which is oscillatory about a horizontal axis, and a cutter mounted on said support and movable in a curvilinear path lengthwise of the tooth.

8. In a gear cutting machine, the combination with a frame pivotally mounted to oscillate about a vertical axis, of a blank carrier mounted on said frame, a cutter support which is oscillatory about a horizontal axis, and a cutter mounted in said support and movable in a circular path lengthwise of the tooth.

9. In a gear cutting machine, the combination with a frame pivotally mounted to oscillate about a vertical axis, of a blank carrier mounted on said frame, a cutter support which is oscillatory about a horizontal axis, and a rotary cutter mounted on said support and movable in a circular path lengthwise of the tooth.

10. In a gear cutting machine, the combination with a blank carrier, of a cutter support which is oscillatory about a horizontal axis to generate the side of a tooth, and a cutter mounted thereon and movable about an axis other than the axis of oscillation in a curvilinear path lengthwise of the tooth.

11. In a gear cutting machine, the combination with a blank carrier, of a cutter support which is oscillatory about a horizontal axis to generate the side of a tooth, and a cutter mounted thereon and movable about an axis other than the axis of oscillation in an arcuate path lengthwise of the tooth.

12. In a gear cutting machine, the combination with a blank carrier, of a cutter support which is oscillatory about a horizontal axis to generate the side of a tooth, and a rotary cutter mounted on said support and movable about an axis other than the axis of oscillation in a circular path lengthwise of the tooth.

13. In a gear cutting machine, the combination with a blank carrier, of a cutter support which is oscillatory about a horizontal axis, means acting to impart an oscillatory movement to said cutter support and simultaneously rotate the blank carrier alternately in opposite directions to generate the profile of the tooth, and a cutter mounted on said support and movable in a curvilinear path lengthwise of the tooth.

14. In a gear cutting machine, the combination with a blank carrier, of a cutter support which is oscillatory about a horizontal axis, means acting to impart an oscillatory movement to said cutter support and simultaneously rotate the blank carrier alternately in opposite directions to generate the profile of the tooth, and a cutter mounted on said support and movable in an arcuate path lengthwise of the tooth.

15. In a gear cutting machine, the combination with a blank carrier, of a cutter support which is oscillatory about a horizontal axis, means acting to impart an oscillatory movement to said cutter support and simultaneously rotate the blank carrier alternately in opposite directions to generate the profile of the tooth, and a rotary cutter mounted on said support and movable in a circular path lengthwise of the tooth.

16. In a gear cutting machine, the combination with a frame pivotally mounted to oscillate about a vertical axis, of a blank carrier mounted on said frame, a cutter support which is oscillatory about a horizontal axis, means acting to impart an oscillatory movement to said cutter support and simultaneously rotate the blank carrier alternately in opposite directions, means for oscillating said frame, and a cutter mounted on the support and movable in a curvilinear path lengthwise of the tooth.

17. In a gear cutting machine, the combination with a frame pivotally mounted to oscillate about a vertical axis, of a blank carrier mounted on said frame, a cutter support which is oscillatory about a horizontal axis, means acting to impart an oscillatory movement to said cutter support and simultaenously rotate the blank carrier alternately in opposite directions, means for oscillating said frame, and a cutter mounted in the support movable in an arcuate path lengthwise of the tooth.

18. In a gear cutting machine the combination with a frame pivotally mounted to oscillate about a vertical axis, of a blank carrier mounted on said frame, a cutter support which is oscillatory about a horizontal axis, means acting to impart an oscillatory movement to said cutter support and simultaneously rotate the blank carrier alternately in opposite directions, means for oscillating said frame, and a rotary cutter mounted on said support and movable in a circular parth lengthwise of the tooth.

19. In a gear cutting machine, the combination with a pivotally mounted frame and an oscillatory support, of a blank carrier mounted on one of said parts and a cutter mounted on the other, and reversing mechanism operatively connected to the blank carrier and to the support.

20. In a gear cutting machine the combination with a pivotally mounted frame and an oscillatory support, of a blank carrier mounted on the frame and a cutter mounted on the support, and reversing mechanism operatively connected to the blank carrier and to the support.

21. In a gear cutting machine the combination with a pivotally mounted frame and an oscillatory support, of a blank carrier mounted on the frame, reversing mechanism operatively connected to the blank carrier and to the support, and a cutter mounted on the support and adapted to travel in a curvilinear path lengthwise of the tooth.

22. In a gear cutting machine the combination with a pivotally mounted frame and an oscillatory support, of a blank carrier mounted on the frame, reversing mechanism operatively connected to the blank carrier and to the support, and a cutter mounted on the support embodying a cutting portion movable in an arcuate path lengthwise of the tooth.

23. In a gear cutting machine the combination with a pivotally mounted frame and an oscillatory support, of a blank carrier mounted on the frame, reversing mechanism operatively connected to the blank carrier and to the support and a rotary cutter mounted on the support, and movable in a circular path lengthwise of the tooth.

24. In a gear cutting machine, the combination with a blank carrier, of a rotary cutter, means for operating the cutter in a curved path across the face of the blank, means for rolling the blank carrier, and means for simultaneously oscillating the cutter about an axis other than and parallel to its rotative axis.

25. In a gear cutting machine, the combination with a blank carrier, of a rotary cutter, means for rolling the blank relatively to the cutter to generate the tooth, means for oscillating the cutter about an axis other than its rotative axis, and means for positively holding the blank against rotation on its axis except that due to said rolling motion during the cutting operation.

26. In a gear cutting machine the combination with a blank carrier, of a rotary cutter, means for rolling the blank relatively to the cutter to generate the tooth, and means for simultaneously oscillating the cutter about an axis other than its rotative axis.

27. In a gear cutting machine, the combination with a blank carrier, of a rotary cutter, means for rolling the blank relatively to the cutter to generate the tooth, means for operating the cutter in a curved path through the arc of a circle across the face of the blank, and means for simultaneously oscillating the cutter about an axis other than its rotative axis.

28. In a gear cutting machine, the combination with a blank carrier, of a rotary cutter, means for operating the cutter across the face of the blank in a curved path, and means for simultaneously oscillating the cutter about an axis other than its rotative axis.

29. The method of cutting gears which consists in moving a tool in a curved path to shape the tooth and simultaneously rolling the tool relatively to the blank in a path out of parallelism with the cutting path to generate the tooth.

30. The method of cutting gears which consists in causing the cutter to travel in a circular path across the face of the blank, and simultaneously rolling the cutter about an axis other than its rotative axis.

JAMES E. GLEASON.
ARTHUR L. STEWART.
EDWARD W. BULLOCK.

Witnesses:
EARLE V. PATTERSON,
S. H. EARL.